(12) United States Patent
Scholten et al.

(10) Patent No.: US 6,887,607 B1
(45) Date of Patent: May 3, 2005

(54) FUEL CELL SYSTEM FOR GENERATING ELECTRIC ENERGY AND HEAT

(75) Inventors: Anton Scholten, Apeldoorn (NL); Petrus Franciscus M. T. van Nisselrooij, Nijmegen (NL); Joannes Maria der Kinderen, Twello (NL); Heinz Werner Freese, Apeldoorn (NL)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/980,106

(22) PCT Filed: May 26, 2000

(86) PCT No.: PCT/NL00/00365
§ 371 (c)(1),
(2), (4) Date: Apr. 9, 2002

(87) PCT Pub. No.: WO00/74164
PCT Pub. Date: Dec. 7, 2000

(30) Foreign Application Priority Data

| May 27, 1999 | (NL) | ............................................. 1012162 |
| Nov. 3, 1999 | (NL) | ............................................. 1013474 |

(51) Int. Cl.[7] ......................... H01M 8/12; H01M 8/18; H01M 8/04; B01J 8/04; F28D 15/00
(52) U.S. Cl. ............................. 429/26; 429/20; 429/24; 422/188; 165/104.34
(58) Field of Search ............................. 429/19, 20, 26, 429/24, 120; 422/187, 188; 165/104.19, 104.34

(56) References Cited

FOREIGN PATENT DOCUMENTS

| AU | 9724945 | * 1/1998 | ............ H01M/8/06 |
| DE | 197 31 642 | 2/1999 | |
| DE | 197 41 331 | 4/1999 | |
| EP | 0 951 087 | 10/1999 | |
| JP | 1-167960 | 7/1989 | |
| JP | 6-260196 | 9/1994 | |
| JP | 10-308230 | 11/1998 | |
| WO | 95/06842 | 3/1995 | |

* cited by examiner

Primary Examiner—Raymond Alejandro
(74) Attorney, Agent, or Firm—Weingarten, Schurgin, Gagnebin & Lebovici LLP

(57) ABSTRACT

The fuel processor system of the invention generates hydrogen from a hydrocarbon compound or from mixtures of hydrocarbon compounds for generating electric energy and heat by way of a combustion path, along which the generated hydrogen is passed for combustion. Included in the combustion path is at least one fuel cell for generating electric energy. The system further includes a first heat exchanger and a second heat exchanger, which, on the one hand, are series included in the combustion path downstream of the fuel cell. The first heat exchanger exchanges heat between the combustion path and a first heating circuit which includes the fuel cell. The second heat exchanger exchanges heat between the combustion path and a second heating circuit which includes the fuel processor. The generated hydrogen undergoes combustion where the fuel cell assists in generating electric energy and, optionally, the fuel processor assists in generating heat.

4 Claims, 1 Drawing Sheet

FUEL CELL SYSTEM FOR GENERATING ELECTRIC ENERGY AND HEAT

Figure 1:
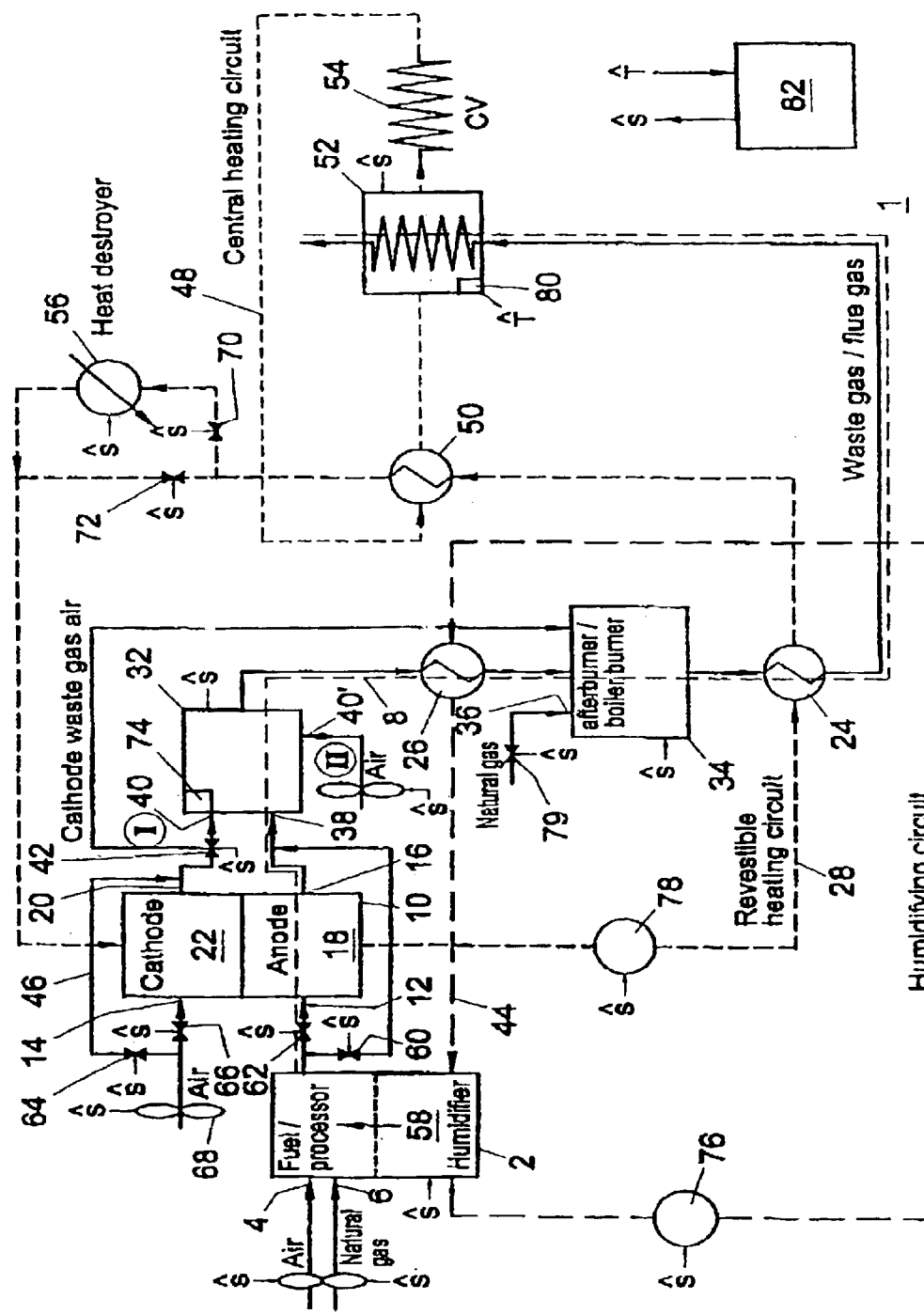

The invention relates to a system provided with a fuel processor for generating hydrogen from a hydrocarbon compound and a combustion path, along which the generated hydrogen is passed for combustion, and in which combustion path at least one fuel cell is included for at least generating electric energy and optionally heat through combustion of the hydrogen generated by the fuel processor.

Such systems are known per se. In these known systems the energy production of the fuel cell is integrated, by means of heat exchange, with the energy requirement of the fuel processor, in particular for generating steam, but also for the supply of energy for $H_2$ production via the endothermic steam reforming reaction. Such a system is not suitable for providing, for instance, a building or house with a strongly varying amount of electric energy. Also, the system is not suitable for starting up autonomously. The fact is that, in full operation, both the fuel cell and the fuel processor must be provided with heat. Methods have already been described for the startup of the fuel cell with heat generated by a stationarily operating fuel processor. The problem with this method still is, however, that the fuel processor must be started up while heat is supplied.

The present invention has for its object to provide one system for both the integration of the energy product of the fuel cell with the energy requirement of the fuel processor and for the simultaneous startup of the fuel cell and the fuel processor. Also, the system should be able to satisfy a variable energy requirement.

To this end, the system according to the invention is characterized in that the system is further provided with a first heat exchanger and a second heat exchanger which, on the one hand, are series included in the combustion path downstream of the fuel cell, a first heating circuit in which the fuel cell is included, and a second heating circuit in which the fuel processor is included, which first heat exchanger, on the other hand, is included in the first heating circuit for exchanging heat between the combustion path and the first heating circuit, and which second heat exchanger, on the other hand, is included in the second heating circuit for exchanging heat between the combustion path and the second heating circuit.

Because of the first and the second heating circuit, when starting up respectively the fuel cell and the fuel processor can be provided with heat. In operation, the first heating circuit can even be used to discharge an excess of energy generated by the fuel cell for other purposes, as will be further explained below.

In particular, it holds that the system is further provided with a waste gas burner included in the combustion path between the fuel cell and the second heat exchanger. By means of the waste gas burner the hydrogen not yet completely burned by the fuel cell can still be, at least almost, completely burned.

More in particular, it holds that the system is further provided with a burner included in the combustion path between the first and the second heat exchanger, which has the function of after burner or boiler burner.

According to the invention the burner can be utilized as afterburner for hydrogen which even the waste gas burner has not yet completely burned.

In particular, it holds that the waste gas burner is further provided with at least one first inlet included in the combustion path and a second inlet for supplying air. More in particular, it holds in this connection that the system is arranged such that waste gas air originating from the fuel cell or air from elsewhere can be supplied to the waste gas burner. The fuel cell is provided with a first inlet connected with the fuel processor for supplying hydrogen to the fuel cell, a second inlet for supplying air to the fuel cell, a first outlet for discharging waste gas from an anode of the fuel cell and a second outlet for discharging waste gas air from a cathode of the fuel cell.

In this connection, it preferably holds that the first outlet of the fuel cell is connected with the first inlet of the waste gas burner included in the combustion path. The second outlet of the fuel cell may then be connected with the burner for supplying waste gas air from the fuel cell to the burner. Preferably, it holds that via a control valve the second outlet is also connected with the second outlet of the waste gas burner to supply waste gas air to the waste gas burner. It is also possible, however, to use a separate air supply.

According to an advanced embodiment of the system it holds that the system is further provided with a controllable first bypass connection for bridging the first inlet and the first outlet of the fuel cell when starting up the system. In this connection, it preferably holds that the system is further provided with a second bypass connection for bridging the second inlet and the second outlet of the fuel cell when starting up.

According to a very suitable use of the system according to the invention it holds that the system is further provided with a central heating circuit and a third heat exchanger for exchanging heat between the first heating circuit and the central heating circuit. The central heating circuit can be provided with a heat exchanger included in the combustion path downstream of the first heat exchanger and capable of functioning as boiler system in combination with the afterburner. In particular, it holds that the first heating circuit is designed as a reversible heating circuit in which a heat transport medium can be selectively pumped round in two directions. The first heating circuit has a double function. When starting up, the fluid flows in the heating circuit of the first heat exchanger to the fuel cell, from the fuel cell to the third heat exchanger, and from the third heat exchanger to the first heat exchanger. The burner can be in operation and burns on waste gas from the waste gas burner and air via the second bypass of the fuel cell. The combustion gases heat the fuel cell.

During stationary operation the burner is basically inoperative. The fluid in the first combustion circuit flows in a direction opposite to the direction when starting up. This involves that the heat of the fuel cell is discharged to the third heat exchanger forming part of the central heating. When the residual heat to this heat exchanger in the fluid is too high to sufficiently cool the fuel cell, the heat can be removed from the first heating circuit by means of a heat destroyer included in this heating circuit, such as a fin. If, however, the fuel cell does not generate sufficient heat for the central heating system, the burner can be used as boiler burner. To this end, the burner is provided with an additional connection to which, for instance, natural gas can be supplied. Combustion heat is then supplied via the first heating circuit and via the flue gases from the burner to the central heating circuit.

In principle, it holds for the system that the electricity demand is leading. The residual energy demand is covered by operating the burner as boiler burner.

The invention will now be explained in more detail with reference to the drawing in which:

FIG. 1 is a schematic diagram of a possible embodiment of the system according to the invention.

In FIG. 1 reference numeral 1 denotes a system according to the invention. The system is provided with a fuel processor 2 for generating hydrogen from a hydrocarbon compound or a mixture of hydrocarbon compounds. To this end, the fuel processor is provided with a first inlet 4 for supplying air and a second inlet 6 for supplying the gaseous hydrocarbon compound or the mixture of hydrocarbon compounds, in this example natural gas. The system is further provided with a combustion path along which the hydrogen generated by the fuel processor 2 is passed for combustion. In the figure this combustion path is denoted by the dotted line 8.

Included in the combustion path 8 is a fuel cell 10 of a known per se type for at least generating electric energy E and optionally heat Q through combustion of the hydrogen generated by the fuel processor 2. In this example the fuel cell is provided with a first inlet 12 which is connected with an outlet of the fuel processor 2 for supplying hydrogen to the fuel cell. Furthermore, the fuel cell is provided with a second inlet 14 for supplying air to the fuel cell. The fuel cell is further provided with a first outlet 16 for discharging waste gas from an anode 18 of the fuel cell and a second outlet 20 for discharging waste gas air from a cathode 22 of the fuel cell.

The system is further provided with a first heat exchanger 24 and a second heat exchanger 26 which, on the one hand, are series included in the combustion path 8 downstream of the fuel cell 10. The system further comprises a first heating circuit 28 in which the fuel cell is included and a second heating circuit 30 in which the fuel processor is included. The first heat exchanger, on the other hand, is included in the first heating circuit 28 for exchanging heat between the combustion path 8 and the first heating circuit. The second heat exchanger 26 is, on the other hand, included in the second heating circuit 30 for exchanging heat between the combustion path 8 and the second heating circuit 30.

The system is further provided with a known per se catalytic waste gas burner 32 included in the combustion path between the fuel cell 10 and the second heat exchanger 26. Included between the first heat exchanger 24 and the second heat exchanger 26 in the combustion path 8 is a burner 34 which may have the function of afterburner or boiler burner. This involves that the fuel cell 10, the waste gas burner 32, the second heat exchanger 26, the burner 34, and the first heat exchanger 24 are series included in the combustion path 8. The burner 34 is further provided with a separate inlet 36 for supplying a gas, such as natural gas. The waste gas burner 32 is further provided with at least one first inlet 38 included in the combustion path 8 and a second inlet 40 for supplying air. In this example the second outlet 20 of the fuel cell 10 is connected with the second inlet 40 of the waste gas burner. It is also possible, however, that the waste gas burner is provided with a separate inlet 40' for supplying air to the waste gas burner. The system is therefore arranged such that waste gas air originating from the fuel cell or air from elsewhere can be supplied to the waste gas burner via respectively the inlet 40 and 40'.

The first outlet 16 of the fuel cell 10 is connected with the first inlet 38 of the waste gas burner 32 included in the combustion path 8. The second outlet 20 of the fuel cell is connected with the burner 34 for supplying waste gas air from the fuel cell 10 to the burner 34. In this example it holds that the second outlet 20 of the fuel cell, via a control valve 42, is also connected with the second inlet 40 of the waste gas burner for supplying waste gas air or air to the waste gas burner 32.

The system is further provided with a controllable first bypass connection 44 for bridging the first inlet 12 and the first outlet 16 of the fuel cell 10 when starting up the system. Also, the system is provided with a second bypass connection 46 for bridging the second inlet 14 and the second outlet 20 of the fuel cell 10 when starting up. In this example the system further comprises a central heating circuit 48 and a third heat exchanger 50 for exchanging heat between the first heating circuit 28 and the central heating circuit 48. The central heating circuit 48 is provided with a heat exchanger 52 included in the combustion path 8 downstream of the first heat exchanger 24. Thus, waste gas flown through the first heat exchanger is supplied to the heat exchanger 52. Besides the third heat exchanger 50 and the heat exchanger 52 a central heating 54 is also included in the central heating circuit 48.

In this example the first heating circuit is designed as a reversible circuit in which a heat transport medium can be selectively pumped round in two directions. The system is further provided with a heat destroyer 56 in the form of, for instance, a fin included in the first heating circuit 28 between the fuel cell 10 and the third heat exchanger 50 for discharging an adjustable amount of heat from the first heating circuit 28.

In this example the fuel processor 2 is provided with humidifying means 58 for humidifying a mixture of natural gas and air, which natural gas and air is supplied to the fuel processor via the first inlet 4 and the second inlet 6. To this end, the humidifying means 58 are provided in this example with a reservoir with water, which reservoir is included in the second heat exchanger 30 for heating the water and for thus adding water vapor to the above mixture. The arrangement is further provided with control valves 60, 62 for adjustably distributing the hydrogen generated by the fuel processor 2 to the first inlet 12 of the fuel cell 10 and the bypass 44. Furthermore, the arrangement is provided with valves 64, 66 for adjustably distributing air drawn in by means of a ventilator 68 via the second inlet 14 of the fuel cell 10 and the second bypass 48. By means of valves 70, 72 the medium flowing through the heating circuit 28 can be passed through the heat destroyer 56 completely or partly, as desired.

The system as described before operates as follows.

When starting up, the fuel processor is not yet heated and will therefore not yet be able to generate gas rich in hydrogen. In a first step natural gas is passed to the fuel processor, mixed with deficient combustion air. In the processor this mixture is burned to form CO and $H_2$. The combustion can take place thermally or catalytically, by means of respectively an electric ignition or an electric heating for starting up the catalyst. When starting up, the valves 60, 62 are arranged such that the mixture of CO, $H_2$ and unburned natural gas leaving the fuel processor 2 is passed via the bypass 44 to the inlet 38 of the waste gas burner 32. Also, the valves 64, 66 are operated such that air drawn in by means of the ventilator 68 is supplied via bypass 46 and the control valve 42 to the burner 34. Moreover, via the control valve 42 a part of the above air can be supplied to the inlet 40 of the waste gas burner 32. When starting up, the waste gas burner 32 is heated by means of a heating unit 74 of the waste gas burner. The heating unit 74 can, for instance, be designed as an electric heating. The result is that the gas mixture from the fuel processor 2 will burn with the air in the waste gas burner 32. As a result, the temperature of the waste gas burner will rise further. The resulting waste gas from the waste gas burner 32 is supplied via the second heat exchanger 26 to the burner 34. As discussed, air is supplied to the burner 34 as well. Unburned components still present in the waste gas are burned in the burner 34, after which the waste gas thus generated is supplied to the first heat exchanger 24.

When starting up, a heat transport medium from the second heating circuit is pumped round by means of a pump 76 such that this medium flows from the second heat exchanger 26 to the humidifying means 58 of the fuel processor. The result is that water vapor is added to the mixture of air and natural gas which is supplied to the fuel processor via the first inlet 4 and the second inlet 6. As a result, the fuel processor will begin to generate gas rich in hydrogen. The complete startup of this $H_2$ production can take up to a few hours. During this period a heat transport medium is pumped round by means of a pump 78 included in the heating circuit, in such a manner that this heat transport medium flows from the first heat exchanger 24 to the fuel cell 10, from the fuel cell 10 to the third heat exchanger 50, and from the third heat exchanger 50 back to the first heat exchanger 24. The result is that the fuel cell 10 is heated as well.

When the fuel cell 10 is heated, while, moreover, the fuel processor generates gas rich in hydrogen, the valves 60 and 62 are operated such that the hydrogen generated by the fuel processor 2 is supplied to the first inlet 12 of the fuel: cell. The first bypass 44 is made inoperative. Also, the air drawn in by means of the ventilator 68 is passed to the second inlet 14 of the fuel cell. This means that the second bypass 46 is also made inoperative. Moreover, the burner 34 becomes inoperative. Besides, the pump 78 is controlled such that it begins to pump round the heat transport medium in an opposite direction, i.e. from the fuel cell 10 to the first heat exchanger 24, from the first heat exchanger 24 to the third heat exchanger 50, and from the third heat exchanger 50 back to the fuel cell 10.

In this situation the hydrogen gas supplied to the fuel cell 10 will burn, at least partly. As a result, the fuel cell 10 will generate electric power E offered for, for instance, the use of electricity in a house. The waste gas is supplied via the outlet 16 of the anode 18 to the inlet 38 of the waste gas burner. Simultaneously, a part of the waste gas air is supplied from the outlet 20 of the cathode via the control valve 42 to the inlet 40 of the waste gas burner. The control valve is adjusted such that the remaining part of the waste gas air continues to flow from the outlet 20 of the cathode through the burner 34, also after it has been extinguished. In the waste gas burner the waste gas originating from the fuel cell 10, as far as the hydrogen had not yet been completely burned herein, is burned further. The waste gas thereby produced in the waste gas burner 32 then flows through the second heat exchanger 26, the burner 34 which is extinguished, and the first heat exchanger 24. The second heat exchanger 26 ensures that heat is continuously supplied to the humidifying means 58. The first heat exchanger 24 now has the function to ensure that the fuel cell 10 is cooled. Heat is supplied via the second heat exchanger 26 to the third heat exchanger 50. The third heat exchanger 50 thereby transmits heat to the central heating circuit 48. Furthermore, the waste gas flown through the first heat exchanger 24 is supplied to the heat exchanger 52. The medium flowing through the central heating circuit 48 then transmits its heat to the central heating 54 which, in a house, may comprise known per se radiators. The heat exchanger 52 is provided in this example with a temperature sensor 80 for measuring the temperature of the medium flowing through the central heating circuit 48. When it appears that the temperature is not high enough to comply with the amount of heat demanded by the central heating 54, the burner 34 can be activated so that it begins to function as boiler burner. A valve 79 is opened for this purpose. To this end, natural gas is supplied via the inlet 36 to the burner 34. This has the result that the waste gas from the waste gas burner 32 flowing through the burner 34 will be heated further. This heated waste gas, mixed with flue gas from the burner 34, flows through the first heat exchanger and can thus transmit a part of the heat content to the heating circuit 28 which, in turn, transmits heat to the central heating circuit via the third heat exchanger 50. The mixture of flue gas and waste gas flows after the first heat exchanger 24 via the combustion path 3 to the heat exchanger 52 where the gas transmits a next part of the heat content to the central heating circuit. The burner 34 and the heat exchanger 52 thus begin to function as boiler.

The use of a catalytic waste gas burner has the further advantage that peak loads can be properly taken up.

When, for instance, the electricity demand is low and from the fuel cell only a minor amount of residual hydrogen flows via the outlet 16 to the inlet 38 of the waste gas burners, the waste gas burner is yet capable of properly burn this. When, however, the electricity demand is high and relatively much residual hydrogen is released by the fuel cell, the waste gas burner can also properly function. When the composition of the waste gas supplied via bypass 44 from the fuel processor 2 to the inlet 38 of the waste gas burner strongly varies when starting up, through the transition of waste gas with relatively much unburned natural gas to a mixture rich in hydrogen, the waste gas burner is yet capable of properly burning this varying mixture.

It is also possible that the waste gas burner is provided with air via a separate inlet 40'. In that case the control valve 42 can be omitted. The second outlet 20 is then only connected with the afterburner 34.

The system is further provided with a control device 82 for controlling the valves 42, 60, 62, 64, 66, 70 and 72, as discussed before. Also, the control device 82 controls the ventilators 68 and 84, the pump 76, the pump 78, the boiler 52, and the central heating 54 as discussed before. The control unit 82 is also connected with the temperature sensor 80 for determining whether it is necessary to operate the burner 34 as boiler burner, as discussed before. The control unit 82 correspondingly controls the burner 34 and the valve 79 for the supply of natural gas to the inlet 36 of the burner, as discussed before.

The invention is in no way limited to the embodiments described before. Thus it is possible that the burner 34 is provided with a separate inlet for the supply of air. It is therefore not necessary that the burner is provided with air originating from the ventilator 68 and supplied or not supplied via the fuel cell 10 and/or the bypass 46 to the burner. In that case the bypass 46 can be omitted. Such variants are each deemed to fall within the scope of the invention.

What is claimed is:

1. A system provided with a fuel processor for generating hydrogen from a hydrocarbon compound and a combustion path, along which the generated hydrogen is passed for combustion, and in which combustion path at least one fuel cell is included for at least generating electric energy and optionally heat through combustion of the hydrogen generated by the fuel processor, characterized in that the system is further provided with a first heat exchanger and a second heat exchanger which, on the one hand, are series included in the combustion path downstream of the fuel cell, a first heating circuit in which the fuel cell is included, and a second heating circuit in which the fuel processor is included, which first heat exchanger, on the other hand, is included in the first heating circuit for exchanging heat between the combustion path and the first heating circuit, and which second heat exchanger, on the other hand, is included in the second heating circuit for exchanging heat between the combustion path and the second heating circuit;

characterized in that the system is further provided with an afterburner or boiler burner included in the combustion path between the first and the second heat exchanger; and characterized in that the afterburner is further provided with a separate inlet for supplying a gas, such as natural gas.

2. A system provided with a fuel processor for generating hydrogen from a hydrocarbon compound and a combustion path, along which the generated hydrogen is passed for combustion, and in which combustion path at least one fuel cell is included for at least generating electric energy and optionally heat through combustion of the hydrogen generated by the fuel processor, characterized in that the system is further provided with a first heat exchanger and a second heat exchanger which, on the one hand, are series included in the combustion path downstream of the fuel cell, a first heating circuit in which the fuel cell is included, and a second heating circuit in which the fuel processor is included, which first heat exchanger, on the other hand, is included in the first heating circuit for exchanging heat between the combustion path and the first heating circuit, and which second heat exchanger, on the other hand, is included in the second heating circuit for exchanging heat between the combustion path and the second heating circuit;

characterized in that the system is further provided with a waste gas burner included in the combustion path between the fuel cell and the second heat exchanger; and characterized in that the waste gas burner is further provided with at least one first inlet included in the combustion path and a second inlet for supplying air.

3. A system provided with a fuel processor for generating hydrogen from a hydrocarbon compound and a combustion path, along which the generated hydrogen is passed for combustion, and in which combustion path at least one fuel cell is included for at least generating electric energy and optionally heat through combustion of the hydrogen generated by the fuel processor, characterized in that the system is further provided with a first heat exchanger and a second heat exchanger which, on the one hand, are series included in the combustion path downstream of the fuel cell, a first heating circuit in which the fuel cell is included, and a second heating circuit in which the fuel processor is included, which first heat exchanger, on the other hand, is included in the first heating circuit for exchanging heat between the combustion path and the first heating circuit, and which second heat exchanger, on the other hand, is included in the second heating circuit for exchanging heat between the combustion path and the second heating circuit;

characterized in that the fuel cell is provided with a first inlet connected with the fuel processor for supplying hydrogen to the fuel cell, a second inlet for supplying air to the fuel cell, a first outlet for discharging waste gas from an anode of the fuel cell and a second outlet for discharging waste gas air from a cathode of the fuel cell; and characterized in that the system is further provided with a controllable first bypass connection for bridging the first inlet and the first outlet of the fuel cell when starting up the system.

4. A system provided with a fuel processor for generating hydrogen from a hydrocarbon compound and a combustion path, along which the generated hydrogen is passed for combustion, and in which combustion path at least one fuel cell is included for at least generating electric energy and optionally heat through combustion of the hydrogen generated by the fuel processor, characterized in that the system is further provided with a first heat exchanger and a second heat exchanger which, on the one hand, are series included in the combustion path downstream of the fuel cell, a first heating circuit in which the fuel cell is included, and a second heating circuit in which the fuel processor is included, which first heat exchanger, on the other hand, is included in the first heating circuit for exchanging heat between the combustion path and the first heating circuit, and which second heat exchanger, on the other hand, is included in the second heating circuit for exchanging heat between the combustion path and the second heating circuit;

characterized in that the system is further provided with a waste gas burner included in the combustion path between the fuel cell and the second heat exchanger;

characterized in that the system is further provided with an afterburner or boiler burner included in the combustion path between the first and the second heat exchanger;

characterized in that the fuel cell, waste gas burner, second heat exchanger, afterburner and first heat exchanger are series connected; and characterized in that the afterburner is further provided with a separate inlet for supplying a gas, such as natural gas, the waste gas burner is further provided with at least one first inlet included in the combustion path and a second inlet for supplying air, and the system is arranged such that waste gas air originating from the fuel cell or air from elsewhere can be supplied to the waste gas burner.

\* \* \* \* \*

UNITED STATES PATENT AND TRADEMARK OFFICE
CERTIFICATE OF CORRECTION

PATENT NO. : 6,887,607 B1 Page 1 of 1
APPLICATION NO. : 09/980106
DATED : May 3, 2005
INVENTOR(S) : Anton Scholten et al.

It is certified that error appears in the above-identified patent and that said Letters Patent is hereby corrected as shown below:

Front page, Abstract (57), lines 8-9, delete "on the one hand,"; and

Column 6, line 10, "3" should read --8--.

Signed and Sealed this

First Day of August, 2006

JON W. DUDAS
*Director of the United States Patent and Trademark Office*